US012767907B2

(12) United States Patent
Namiki et al.

(10) Patent No.: US 12,767,907 B2
(45) Date of Patent: Oct. 20, 2026

(54) AQUEOUS CLEANING LIQUID

(71) Applicant: TOKYO OHKA KOGYO CO., LTD., Kanagawa (JP)

(72) Inventors: Takumi Namiki, Kanagawa (JP); Shinji Kumada, Kanagawa (JP); Eita Suga, Kanagawa (JP); Kenta Kimura, Kanagawa (JP); Jun Kondo, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 283 days.

(21) Appl. No.: 18/433,986

(22) Filed: Feb. 6, 2024

(65) Prior Publication Data

US 2024/0279569 A1 Aug. 22, 2024

Related U.S. Application Data

(60) Provisional application No. 63/445,300, filed on Feb. 14, 2023.

(51) Int. Cl.

| | |
|---|---|
| ***C11D 3/00*** | (2006.01) |
| ***C11D 1/66*** | (2006.01) |
| ***C11D 1/72*** | (2006.01) |
| ***C11D 3/04*** | (2006.01) |
| ***C11D 3/20*** | (2006.01) |
| ***C11D 3/28*** | (2006.01) |

(52) U.S. Cl.

CPC .................. *C11D 3/28* (2013.01); *C11D 1/66* (2013.01); *C11D 3/0026* (2013.01); *C11D 3/0073* (2013.01); *C11D 3/042* (2013.01); *C11D 3/2027* (2013.01); *C11D 2111/22* (2024.01)

(58) Field of Classification Search

None

See application file for complete search history.

(56) References Cited

U.S. PATENT DOCUMENTS

| | | | | |
|---|---|---|---|---|
| 2009/0065735 | A1* | 3/2009 | Kolics ...................... | C11D 7/34 252/79.1 |
| 2011/0076852 | A1* | 3/2011 | Takahashi .............. | C11D 7/265 257/E21.224 |
| 2017/0200601 | A1* | 7/2017 | Song ........................ | C11D 7/08 |
| 2018/0201884 | A1* | 7/2018 | Sugishima ........... | C11D 7/3281 |
| 2019/0062674 | A1* | 2/2019 | Dory .................... | C11D 7/5004 |
| 2021/0147768 | A1* | 5/2021 | Oie .......................... | C11D 7/10 |
| 2021/0253903 | A1* | 8/2021 | Huang ..................... | C09G 1/02 |
| 2024/0101936 | A1* | 3/2024 | Koga ....................... | C11D 7/08 |

FOREIGN PATENT DOCUMENTS

WO 2019/208684 A1 10/2019

OTHER PUBLICATIONS

CN 1041529928 A (English Abstract Only) (Year: 2014).*

* cited by examiner

*Primary Examiner* — Lorna M Douyon

(74) *Attorney, Agent, or Firm* — Rankin, Hill & Clark LLP

(57) ABSTRACT

An aqueous cleaning liquid containing hydrofluoric acid, at least one kind of triazole compound selected from the group consisting of triazole and a triazole derivative, and a non-ionic surfactant.

5 Claims, No Drawings

AQUEOUS CLEANING LIQUID

Priority is claimed on U.S. Provisional Application No. 63/445,300, filed on Feb. 14, 2023, the content of which is incorporated herein by reference.

BACKGROUND OF THE INVENTION

Field of the Invention

The present invention relates to an aqueous cleaning liquid.

Description of Related Art

In the process of manufacturing electronic devices such as semiconductor elements, a dry etching step is typically employed in a case of forming a semiconductor integrated circuit. In this dry etching step, dry etching residues (zirconium-based residues, titanium-based residues, polymer residues, and the like) are generated and thus required to be removed. It is preferable that a cleaning agent for removing such dry etching residues does not adversely affect (for example, erosion) a metal material for wiring (such as copper, titanium, cobalt, or tungsten) used for a semiconductor integrated circuit to be cleaned.

For example, Patent Document 1 discloses an aqueous composition containing: 0.0001% to 10% by mass of (A) one or more kind of compounds selected from C4 to C13 alkyl phosphonic acid, C4 to C13 alkyl phosphonic acid ester, C4 to C13 alkyl phosphoric acid, and salts thereof with respect to the total amount of the composition; and 0.0001% to 50% by mass of (B) acids or salts thereof other than the C4 to C13 alkyl phosphonic acid, the C4 to C13 alkyl phosphonic acid ester, and the C4 to C13 alkyl phosphoric acid with respect to the total amount of the composition. Further, it is also described that the aqueous composition containing hydrofluoric acid has cleanability such as dry etching residue removability.

PATENT DOCUMENT

[Patent Document 1] PCT International Publication No. WO2019/208684

SUMMARY OF THE INVENTION

There are various metal materials for wiring used in electronic devices and various masking materials used in a case of dry etching, and thus various combinations thereof are present. Therefore, from the viewpoint of an anticorrosion effect on a metal material for wiring, there is a demand for the development of a new cleaning composition.

The present invention has been made in consideration of the above circumstances, and an object of the present invention is to provide an aqueous cleaning liquid having favorable anticorrosion properties.

In order to achieve the above-described object, the present invention employs the following configurations.

(1) An aqueous cleaning liquid containing:

hydrofluoric acid;

at least one kind of triazole compound selected from the group consisting of triazole and a triazole derivative; and a nonionic surfactant.

(2) The aqueous cleaning liquid according to (1), in which the nonionic surfactant includes an acetylenol type surfactant.

(3) The aqueous cleaning liquid according to (1) or (2), in which the triazole compound includes at least one kind of benzotriazole compound selected from the group consisting of benzotriazole and a benzotriazole derivative.

(4) The aqueous cleaning liquid according to (3), in which the benzotriazole compound includes a compound (BT-1) represented by General Formula (BT-1),

[Chemical Formula 1]

(BT-1)

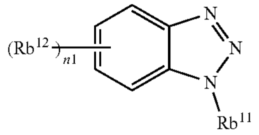

[in the formula, $Rb^{11}$ represents a hydrogen atom, a hydroxyl group, or a substituted or unsubstituted hydrocarbon group; $Rb^{12}$ represents an alkyl group; n1 represents an integer in a range of 1 to 4; and in a case where n1 is an integer of 2 or more, a plurality of $Rb^{12}$'s may be the same or different from each other].

(5) The aqueous cleaning liquid according to (3) or (4), in which the aqueous cleaning liquid contains two or more kinds of the triazole compounds.

(6) The aqueous cleaning liquid according to (5), in which the triazole compound includes a compound (BT-1) represented by General Formula (BT-1) and a compound (BT-2) represented by General Formula (BT-2),

[Chemical Formula 2]

(BT-1)

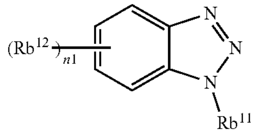

(BT-2)

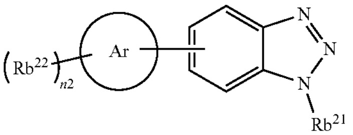

[in the formula, $Rb^{11}$ represents a hydrogen atom, a hydroxyl group, or a substituted or unsubstituted hydrocarbon group; $Rb^{12}$ represents an alkyl group; n1 represents an integer in a range of 1 to 4; in a case where n1 is an integer of 2 or more, a plurality of $R^{12}$'s may be the same or different from each other; $Rb^{21}$ represents a hydrogen atom, a hydroxyl group, or a substituted or unsubstituted hydrocarbon group; Ar represents an aromatic ring; $Rb^{22}$ represents a substituted or unsubstituted hydrocarbon group; n2 represents an integer of 0 or more in a case of being allowed by a valence; and in a case where n2 is an integer of 2 or more, a plurality of $Rb^{22}$'s may be the same or different from each other, where the plurality of $Rb^{22}$'s may be bonded to each other to form a condensed ring together with Ar].

(7) The aqueous cleaning liquid according to (6), in which a mass ratio of the compound (BT-1):the compound (BT-2) is in a range of 10,000:1 to 1,000:1.

(8) The aqueous cleaning liquid according to any one of (1) to (7), in which the aqueous cleaning liquid has a pH in a range of 3 to 7.

According to the present invention, it is possible to provide an aqueous cleaning liquid having favorable anticorrosion properties.

DETAILED DESCRIPTION OF THE INVENTION

In the present specification and the scope of the present claims, the term "aliphatic" is a relative concept used with respect to "aromatic" and defines a group or compound that has no aromaticity.

The term "alkyl group" includes a monovalent saturated hydrocarbon group that is linear, branched, or cyclic unless otherwise specified. The same applies to the alkyl group of an alkoxy group.

In the present specification and the scope of the present claims, asymmetric carbon atoms may be present, and thus enantiomers or diastereomers may be present depending on the structures represented by the chemical formula. In that case, these isomers are represented by one chemical formula. These isomers may be used alone or in the form of a mixture.

(Cleaning Liquid)

An aqueous cleaning liquid according to a first aspect of the present invention contains hydrofluoric acid, a triazole derivative, and a nonionic surfactant. The content of each component in the aqueous cleaning liquid denotes the concentration of the component in a case of using the liquid for cleaning an electronic device. Each component may be prepared at the concentration in advance, or a concentrated product in a distribution and supply form may be diluted to the concentration in a case of using the liquid for cleaning an electronic device.

<Hydrofluoric Acid>

In the present embodiment, the content of the hydrofluoric acid is not particularly limited; however, it is preferably 50 ppm or more, more preferably 100 ppm or more, and still more preferably 300 ppm or more with respect to the total amount of the aqueous cleaning liquid. The upper limit thereof is not particularly limited, and is, for example, 3,000 ppm or less and preferably 2,000 ppm or less in a case of being used for the cleaning liquid.

In a case where the content of hydrofluoric acid is in the above-described preferred range, the cleanability is likely to be made favorable.

It is sufficient to adjust the mass ratio of hydrofluoric acid to the following triazole derivative in a range of 5 to 3,000 in a case where the triazole derivative is set to 1. The mass ratio is preferably in a range of 10 to 2,000, and it is more preferably in a range of 300 to 1,800 from the viewpoint of anticorrosion properties.

<Triazole Compound>

The aqueous cleaning liquid according to the present embodiment contains, as a nitrogen-containing aromatic heterocyclic compound, at least one kind of triazole compound selected from the group consisting of triazole and a triazole derivative (hereinafter, also simply referred to as a "triazole compound").

In the aqueous cleaning liquid according to the present embodiment, the triazole compound is coordinated on a surface of a metal layer, which is to be a wire or the like of a semiconductor device, to form a dense film, thereby preventing the corrosion of the metal layer due to overetching or the like. That is, it functions as an anticorrosion agent.

The triazole compound is not particularly limited as long as it is a compound having a triazole ring. Examples of the triazole compound include a compound represented by General Formula (I) (hereinafter, also referred to as a "compound (I)"), a compound represented by General Formula (II) (hereinafter, also referred to as a "compound (II)"), and a compound represented by General Formula (III) (hereinafter, also referred to as a "compound (III)").

Hereinafter, the compounds represented by General Formulae (I) to (III) will be described.

(Compound (I))

The compound (I) is represented by General Formula (I).

[Chemical Formula 3]

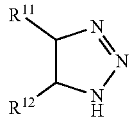

(I)

[In General Formula (I), $R^{11}$ and $R^{12}$ each independently represent a hydrogen atom or a substituted or unsubstituted hydrocarbon group. In addition, $R^{11}$ and $R^{12}$ may bond to each other to form a ring.]

In General Formula (I), examples of the hydrocarbon group represented by $R^{11}$ and $R^{12}$ include an alkyl group (preferably having 1 to 12 carbon atoms, more preferably having 1 to 6 carbon atoms, and still more preferably having 1 to 3 carbon atoms), an alkenyl group (preferably having 2 to 12 carbon atoms and more preferably having 2 to 6 carbon atoms), an alkynyl group (preferably having 2 to 12 carbon atoms and more preferably having 2 to 6 carbon atoms), an aryl group (preferably having 6 to 18 carbon atoms, more preferably having 6 to 14 carbon atoms, and still more preferably having 6 to 10 carbon atoms), and an aralkyl group (preferably having 7 to 23 carbon atoms, more preferably having 7 to 15 carbon atoms, and still more preferably having 7 to 11 carbon atoms).

The hydrocarbon group represented by $R^{11}$ and $R^{12}$ may have a substituent. Examples of the substituent include an alkyl group (preferably having 1 to 12 carbon atoms, more preferably having 1 to 6 carbon atoms, and still more preferably having 1 to 3 carbon atoms), an aryl group (preferably having 6 to 18 carbon atoms, more preferably having 6 to 14 carbon atoms, and still more preferably having 6 to 10 carbon atoms), a hydroxyl group, a carboxy group, and $—N(R^a)(R^b)$. $R^a$ and $R^b$ each independently represent a hydrogen atom or an organic group. The organic group is preferably an alkyl group (which has, for example, 1 to 12 carbon atoms, preferably has 1 to 6 carbon atoms, and more preferably has 1 to 4 carbon atoms) or a hydroxyalkyl group (which has, for example, 1 to 12 carbon atoms, preferably has 1 to 6 carbon atoms, and more preferably has 1 to 4 carbon atoms).

$R^{11}$ and $R^{12}$ may bond to each other to form a ring. The ring obtained by bonding $R^{11}$ and $R^{12}$ to each other is not particularly limited; however, it is preferably an aromatic ring (which may be monocyclic or polycyclic), and it is preferably a benzene ring. Further, the ring obtained by bonding $R^{11}$ and $R^{12}$ to each other may have a substituent.

The substituent is not particularly limited; however, examples thereof include those described as the examples of the substituent of the hydrocarbon group represented by $R^{11}$ and $R^{12}$.

It is noted that in the present specification, the compound represented by General Formula (I) includes a compound represented by General Formula (IA) which is a tautomer of the compound represented by General Formula (I).

[Chemical Formula 4]

(IA)

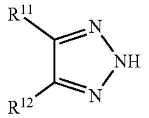

[In General Formula (IA), $R^{11}$ and $R^{12}$ each independently represent a hydrogen atom or a substituted or unsubstituted hydrocarbon group. In addition, $R^{11}$ and $R^{12}$ may bond to each other to form a ring.]

In General Formula (IA), $R^{11}$ and $R^{12}$ each have the same meaning as $R^{11}$ and $R^{12}$ in General Formula (I), and the same applies to the suitable aspects thereof.

(Compound (II))

The compound (II) is represented by General Formula (II).

[Chemical Formula 5]

(II)

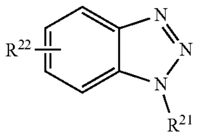

[In General Formula (II), $R^{21}$ and $R^{22}$ each independently represent a hydrogen atom, a hydroxyl group, or a substituted or unsubstituted hydrocarbon group. However, in a case where $R^{21}$ is a hydrogen atom, $R^{22}$ represents a substituted or unsubstituted hydrocarbon group. In addition, in a case where $R^{21}$ is a hydrogen atom, and $R^{22}$ represents a substituted or unsubstituted hydrocarbon group, where in a case where $R^{21}$ and $R^{22}$ in General Formula (I) are bonded to each other to form a benzene ring, and this benzene ring has a substituent, $R^{22}$ represents a group different from the substituent.]

In General Formula (II), the substituted or unsubstituted hydrocarbon group represented by $R^{21}$ and $R^{22}$ has the same meaning as the substituted or unsubstituted hydrocarbon group represented by $R^{11}$ and $R^{12}$.

Among the above, the hydrocarbon group represented by $R^{21}$ is preferably an alkyl group (preferably having 1 to 12 carbon atoms, more preferably having 1 to 6 carbon atoms, and still more preferably having 1 to 3 carbon atoms) or an aryl group (preferably having 6 to 18 carbon atoms, more preferably having 6 to 14 carbon atoms, and still more preferably having 6 to 10 carbon atoms). It is noted that the hydrocarbon group represented by $R^{21}$ may have a substituent. Examples of the substituent include those described as the examples of the substituent of the hydrocarbon group represented by $R^{11}$ and $R^{12}$.

Among them, the hydrocarbon group represented by $R^{22}$ is preferably an alkyl group (preferably having 1 to 12 carbon atoms, more preferably having 1 to 6 carbon atoms, and still more preferably having 1 to 3 carbon atoms). It is noted that the hydrocarbon group represented by $R^{22}$ may have a substituent. Examples of the substituent include those described as the examples of the substituent of the hydrocarbon group represented by $R^{11}$ and $R^{12}$.

In General Formula (II), in a case where $R^{21}$ is a hydrogen atom, $R^{22}$ represents a substituted or unsubstituted hydrocarbon group. That is, there is no case where both $R^{21}$ and $R^{22}$ are a hydrogen atom.

Further, in a case where $R^{21}$ is a hydrogen atom, and $R^{22}$ represents a substituted or unsubstituted hydrocarbon group, where in a case where $R^{21}$ and $R^{22}$ in General Formula (I) are bonded to each other to form a benzene ring, and this benzene ring has a substituent, $R^{22}$ represents a group different from the substituent. In addition, in this case, the number of carbon atoms in $R^{22}$ is preferably larger than the number of carbon atoms in the substituent from the viewpoint that all of the anticorrosion properties, the residue removability, and the defect suppressibility are more excellent.

(Compound (III))

The compound (III) is represented by General Formula (III).

[Chemical Formula 6]

(III)

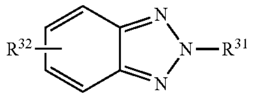

[In General Formula (III), $R^{31}$ and $R^{32}$ each independently represent a hydrogen atom or a substituted or unsubstituted hydrocarbon group. However, in a case where $R^{31}$ is a hydrogen atom, $R^{32}$ represents a substituted or unsubstituted hydrocarbon group. In addition, in a case where $R^{31}$ is a hydrogen atom, and $R^{32}$ represents a substituted or unsubstituted hydrocarbon group, where in a case where $R^{11}$ and $R^{12}$ in General Formula (I) are bonded to each other to form a benzene ring, and this benzene ring has a substituent, $R^{32}$ represents a group different from the substituent.]

In General Formula (III), $R^{31}$ and $R^{32}$ each have the same meaning as $R^{21}$ and $R^{22}$ in General Formula (II), and the same applies to the suitable aspects thereof.

However, in a case where $R^{31}$ is a hydrogen atom, $R^{32}$ represents a substituted or unsubstituted hydrocarbon group. In addition, in a case where $R^{31}$ is a hydrogen atom, and $R^{32}$ represents a substituted or unsubstituted hydrocarbon group, where in a case where $R^{31}$ and $R^{32}$ in General Formula (III) are bonded to each other to form a benzene ring, and this benzene ring has a substituent, $R^{32}$ represents a group different from the substituent. In addition, in this case, the number of carbon atoms in $R^{32}$ is preferably larger than the number of carbon atoms in the substituent from the viewpoint that all of the anticorrosion properties, the residue removability, and the defect suppressibility are more excellent.

In the present embodiment, from the viewpoint of further improving the anticorrosion properties of the aqueous cleaning liquid, the triazole compound preferably includes at least one kind of benzotriazole compound selected from the group consisting of benzotriazole and a benzotriazole derivative.

From the viewpoint of further improving the anticorrosion properties of the aqueous cleaning liquid, the benzotriazole compound preferably includes a compound (BT-1) represented by General Formula (BT-1).

[Chemical Formula 7]

(BT-1)

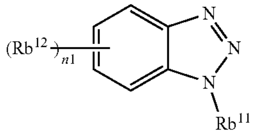

[In the formula, $Rb^{11}$ represents a hydrogen atom, a hydroxyl group, or a substituted or unsubstituted hydrocarbon group; $Rb^{12}$ represents an alkyl group; n1 represents an integer in a range of 1 to 4; and in a case where n1 is an integer of 2 or more, a plurality of $Rb^{12}$'s may be the same or different from each other.]

In Formula (BT-1), the substituted or unsubstituted hydrocarbon group represented by $Rb^{11}$ has the same meaning as $R^{21}$ in General Formula (II), and the same applies to the suitable aspect thereof. Among the above, $Rb^{11}$ is preferably a hydrogen atom.

In Formula (BT-1), the alkyl group represented by $Rb^{12}$ is preferably a linear or branched alkyl group having 1 to 12 carbon atoms, more preferably a linear or branched alkyl group having 1 to 6 carbon atoms, still more preferably a linear or branched alkyl group having 1 to 3 carbon atoms, and particularly preferably a methyl group.

In Formula (BT-1), n1 is an integer in a range of 1 to 4. From the viewpoint of further improving the anticorrosion properties of the aqueous cleaning liquid, n1 is preferably an integer in a range of 1 to 3, more preferably 1 or 2, and still more preferably 1.

From the viewpoint of further improving the anticorrosion properties of the aqueous cleaning liquid, the aqueous cleaning liquid according to the present embodiment preferably contains two or more kinds of triazole compounds and more preferably contains a compound (BT-1) represented by General Formula (BT-1) and a compound (BT-2) represented by General Formula (BT-2).

[Chemical Formula 8]

(BT-1)

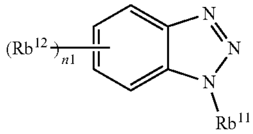

(BT-2)

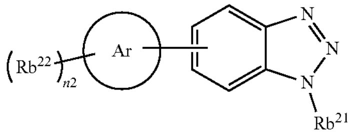

[In the formula, $Rb^{11}$ represents a hydrogen atom, a hydroxyl group, or a substituted or unsubstituted hydrocarbon group; $Rb^{12}$ represents an alkyl group; n1 represents an integer in a range of 1 to 4; in a case where n1 is an integer of 2 or more, a plurality of $R^{12}$'s may be the same or different from each other; $Rb^{21}$ represents a hydrogen atom, a hydroxyl group, or a substituted or unsubstituted hydrocarbon group; Ar represents an aromatic ring; $Rb^{22}$ represents a substituted or unsubstituted hydrocarbon group; n2 represents an integer of 0 or more in a case of being allowed by a valence; and in a case where n2 is an integer of 2 or more, a plurality of $Rb^{22}$'s may be the same or different from each other, where the plurality of $Rb^{22}$'s may be bonded to each other to form a condensed ring together with Ar.]

General Formula (BT-1) has the same meaning as Formula (BT-1) described above, and the same applies to the suitable aspect thereof.

In Formula (BT-2), the substituted or unsubstituted hydrocarbon group represented by $Rb^{21}$ has the same meaning as $R^{21}$ in General Formula (II), and the same applies to the suitable aspect thereof. Among the above, $Rb^{21}$ is preferably a hydrogen atom.

In Formula (BT-2), Ar represents an aromatic ring. The aromatic ring represented by Ar is not particularly limited as long as it is a cyclic conjugated system having (4n+2) $\pi$ electrons, and the aromatic ring may be monocyclic or polycyclic. The aromatic ring preferably has 5 to 30 carbon atoms, more preferably has 5 to 20 carbon atoms, still more preferably has 6 to 15 carbon atoms, and particularly preferably has 6 to 12 carbon atoms.

Specific examples of the aromatic ring represented by Ar include aromatic hydrocarbon rings such as benzene, naphthalene, anthracene, and phenanthrene; and an aromatic heterocyclic ring obtained by substituting a part of carbon atoms constituting the above-described aromatic hydrocarbon ring with a hetero atom. Examples of the hetero atom in the aromatic heterocyclic rings include an oxygen atom, a sulfur atom, and a nitrogen atom. Specific examples of the aromatic heterocyclic ring include a pyridine ring and a thiophene ring.

Among them, the aromatic ring represented by Ar is preferably a benzene ring.

In Formula (BT-2), $Rb^{22}$ has the same meaning as $R^{22}$ in General Formula (II). Among the above, $Rb^{22}$ is preferably an alkyl group, more preferably a linear or branched alkyl group having 1 to 12 carbon atoms, still more preferably a linear or branched alkyl group having 1 to 6 carbon atoms, even still more preferably a linear or branched alkyl group having 1 to 3 carbon atoms, and particularly preferably a methyl group.

In Formula (BT-2), n2 represents an integer of 0 or more in a case of being allowed by a valence, and it is preferably an integer in a range of 0 to 5 and more preferably an integer in a range of 0 to 4.

In a case where n2 is an integer of 2 or more, a plurality of $Rb^{22}$'s may be the same or different from each other, where the plurality of $Rb^{22}$'s may be bonded to each other to form a condensed ring together with Ar. Examples of the condensed ring formed by bonding a plurality of $Rb^{22}$'s to each other, together with Ar, include an indane ring and a tetrahydronaphthalene ring.

The condensed ring formed by bonding a plurality of $Rb^{22}$'s to each other, together with Ar, may have a substituent. Examples of the substituent include those described as the examples of the substituent of the hydrocarbon group represented by $R^{11}$ and $R^{12}$, where the substituent is preferably an alkyl group, more preferably a linear or branched alkyl group having 1 to 12 carbon atoms, still more preferably a linear or branched alkyl group having 1 to 6 carbon atoms, even still more preferably a linear or branched alkyl group having 1 to 3 carbon atoms, and particularly preferably a methyl group.

In a case where the aqueous cleaning liquid according to the present embodiment contains the compound (BT-1) and the compound (BT-2), the mass ratio of the compound (BT-1):the compound (BT-2) is preferably in a range of 10,000:1 to 10:1, more preferably in a range of 5,000:1 to 30:1, and still more preferably in a range of 3,000:1 to 50:1.

In a case where the mass ratio of the compound (BT-1):the compound (BT-2) is within the above-described preferred range, the anticorrosion properties of the aqueous cleaning liquid are likely to be favorable.

Specific examples of the triazole compound include triazoles such as 1,2,3-triazole, 1,2,4-triazole, 3-amino-1H-1,2,4-triazole, 1-acetyl-1H-1,2,3-triazolo[4,5-b]pyridine, 1H-1,2,3-triazolo[4,5-b]pyridine, 1,2,4-triazolo[4,3-a]pyridin-3(2H)-one, and 3H-1,2,3-triazolo[4,5-b]pyridin-3-ol; and benzotriazoles such as 1,2,3-benzotriazole, 5-methyl-1H-1,2,3-benzotriazole, 5,6-dimethyl-1H-1,2,3-benzotriazole, 5-(m-tolyl)-1H-benzotriazole, 5-(4,6-dimethyl-2,3-dihydro-1H-inden-5-yl)-1H-benzotriazole, 1-hydroxybenzotriazole, 1-dihydroxypropylbenzotriazole, 2,3-dicarboxypropylbenzotriazole, 4-hydroxybenzotriazole, 4-carboxyl-1H-benzotriazole, 4-carboxyl-1H-benzotriazole methyl ester, 4-carboxyl-1H-benzotriazole butyl ester, 4-carboxyl-1H-benzotriazole octyl ester, 5-hexylbenzotriazole, [1,2,3-benzotriazolyl-1-methyl][1,2,4-triazolyl-1-methyl][2-ethylhexyl]amine, tolyltriazole, naphthotriazole, bis[(1-benzotriazolyl)methyl]phosphonic acid, and 3-aminotriazole.

Preferred specific examples of the triazole compound are shown below; however, the triazole compound in the present embodiment is not limited thereto.

[Chemical Formula 9]

(N-1)

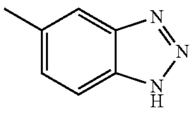

(N-2)

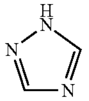

(N-3)

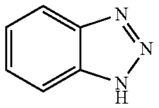

(N-4)

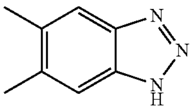

(N-5)

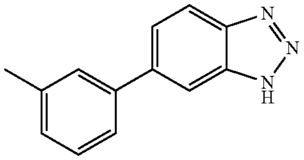

-continued (N-6)

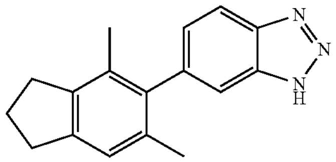

In the present embodiment, the content of the triazole compound is not particularly limited; however, it is preferably 100 ppm or more, more preferably 300 ppm or more, and still more preferably 500 ppm or more with respect to the total amount of the aqueous cleaning liquid.

In a case where the content of the triazole compound is within the above-described preferred range, the anticorrosion properties of the aqueous cleaning liquid are likely to be favorable.

The upper limit value of the content of the triazole compound is not particularly limited; however, it is typically 1% or less.

In a case where the aqueous cleaning liquid according to the present embodiment contains the compound (BT-1) and the compound (BT-2), the content of the compound (BT-1) is preferably 100 ppm or more, more preferably 300 ppm or more, and still more preferably 500 ppm or more with respect to the total amount of the aqueous cleaning liquid, and the content of the compound (BT-2) is preferably 1 ppm or more, more preferably 3 ppm or more, and still more preferably 5 ppm or more with respect to the total amount of the aqueous cleaning liquid.

In a case where the contents of the compound (BT-1) and the compound (BT-2) are within the above-described preferred range, the anticorrosion properties of the aqueous cleaning liquid are likely to be favorable.

<Nonionic Surfactant>

Nonionic Surfactant

Examples of the nonionic surfactant include an acetylenol type surfactant, a polyalkylene oxide alkyl phenyl ether-based surfactant, a polyalkylene oxide alkyl ether-based surfactant, a block polymer-based surfactant consisting of polyethylene oxide and polypropylene oxide, a polyoxyalkylene distyrenated phenyl ether-based surfactant, a polyalkylene tribenzyl phenyl ether-based surfactant, and an acetylene polyalkylene oxide-based surfactant.

Among them, the nonionic surfactant is preferably an acetylenol type surfactant from the viewpoint of improving the effect of preventing foaming.

Specific examples of the nonionic surfactant are shown below; however, in the present embodiment, the nonionic surfactant is not limited thereto.

[Chemical Formula 10]

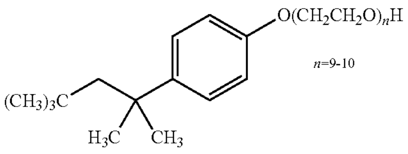

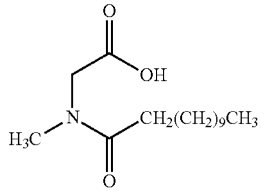

-continued

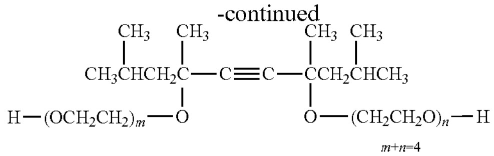

In the present embodiment, the content of the nonionic surfactant is not particularly limited; however, it is preferably 10 ppm or more, more preferably 30 ppm or more, and still more preferably 50 ppm or more with respect to the total amount of the aqueous cleaning liquid.

In a case where the content of the nonionic surfactant is within the preferred range, the effect of preventing foaming is more likely to be improved.

The upper limit value of the content of the nonionic surfactant is not particularly limited; however, it is typically 1% or less.

<Water>

The aqueous cleaning liquid according to the present embodiment contains water as a diluent. In the present embodiment, water is not particularly limited, but water obtained by carrying out distillation, an ion exchange treatment, a filter treatment, various adsorption treatments, and the like to remove metal ions, organic impurities, particles, and the like is preferable, and pure water or ultrapure water is particularly preferable.

The content of water is typically in a range of 40% to 99.9998% by mass and preferably in a range of 89.5% to 99.998% by mass with respect to the total amount of the aqueous cleaning liquid.

The aqueous cleaning liquid according to the present embodiment may contain an optional component in addition to the hydrofluoric acid, the triazole compound, and the nonionic surfactant. Examples of the optional components include an acid other than the hydrofluoric acid an anticorrosion agent, a surfactant other than the nonionic surfactant, a pH adjusting agent, a buffer, and an organic solvent.

<Acid Other than Hydrofluoric Acid>

The aqueous cleaning liquid according to the present embodiment may contain another acid (hereinafter, also simply referred to as "the other acid") other than the hydrofluoric acid.

The other acid may be an inorganic acid or may be an organic acid.

Examples of the inorganic acid include nitric acid, sulfuric acid, hydrochloric acid, and phosphoric acid.

Examples of the organic acid include an aliphatic carboxylic acid having 1 to 18 carbon atoms, an aromatic carboxylic acid having 6 to 10 carbon atoms, and an amino acid having 1 to 10 carbon atoms.

Preferred examples of the aliphatic carboxylic acid having 1 to 18 carbon atoms include formic acid, acetic acid, propionic acid, lactic acid, glycolic acid, diglycolic acid, pyruvic acid, malonic acid, butyric acid, hydroxybutyric acid, tartaric acid, succinic acid, malic acid, maleic acid, fumaric acid, valeric acid, glutaric acid, itaconic acid, adipic acid, caproic acid, adipic acid, citric acid, propanetricarboxylic acid, trans-aconitic acid, enantoic acid, caprylic acid, lauric acid, myristic acid, palmitic acid, stearic acid, oleic acid, linoleic acid, and linolenic acid.

Preferred examples of the aromatic carboxylic acid having 6 to 10 carbon atoms include benzoic acid, salicylic acid, mandelic acid, phthalic acid, isophthalic acid, and terephthalic acid.

Preferred examples of the amino acid having 1 to 10 carbon atoms include carbamic acid, alanine, glycine, asparagine, aspartic acid, sarcosine, serine, glutamine, glutamic acid, 4-aminobutyric acid, iminodibutyric acid, arginine, leucine, isoleucine, and nitrilotriacetic acid.

In a case where the aqueous cleaning liquid according to the present embodiment contains another acid, the content of the other acid is preferably in a range of 0.0001% to 50% by mass, more preferably in a range of 0.0005% to 20% by mass, and still more preferably in a range of 0.001% to 10% by mass with respect to the total amount of the aqueous cleaning liquid.

The aqueous cleaning liquid according to the present embodiment may not contain the other acid and may not contain one or more kinds of the compounds described as the specific examples of the other acid.

«Anticorrosion Agent»

The aqueous cleaning liquid according to the present embodiment may contain an anticorrosion agent.

Exemplary examples of the anticorrosion agent include compounds containing a nitrogen-containing heterocyclic ring such as an imidazole ring, a pyridine ring, a phenanthroline ring, a tetrazole ring, a pyrazole ring, a pyrimidine ring, and a purine ring.

Examples of the compound containing an imidazole ring include imidazoles such as 2-methylimidazole, 2-ethylimidazole, 2-isopropylimidazole, 2-propylimidazole, 2-butylimidazole, 4-methylimidazole, 2,4-dimethylimidazole, 2-ethyl-4-methylimidazole, 2-undecylimidazole, 2-aminoimidazole, and benzimidazole; and biimidazoles such as 2,2'-biimidazole. Among those, biimidazoles are preferable, and 2,2'-biimidazole is more preferable.

Examples of the compound containing a pyridine ring include pyridines such as 1H-1,2,3-triazolo[4,5-b]pyridine, 1-acetyl-1H-1,2,3-triazolo[4,5-b]pyridine, 3-aminopyridine, 4-aminopyridine, 3-hydroxypyridine, 4-hydroxypyridine, 2-acetamidopyridine, 4-pyrrolidinopyridine, 2-cyanopyridine, 2,6-pyridinecarboxylic acid, and 2,4,6-trimethylpyridine; and bipyridyls such as 2,2'-bipyridyl, 4,4'-dimethyl-2,2'-bipyridyl, 4,4'-di-tert-butyl-2,2'-bipyridyl, 4,4-dinonyl-2,2-bipyridyl, 2,2"-bipyridine-6,6'-dicarboxylic acid, and 4,4'-dimethoxy-2,2'-bipyridyl. Among those, bipyridyls are preferable, and 2,2'-bipyridyl, 4,4'-dimethyl-2,2'-bipyridyl, 4,4'-di-tert-butyl-2,2'-bipyridyl, 4,4-dinonyl-2,2-bipyridyl, 2,2"-bipyridine-6,6'-dicarboxylic acid, and 4,4'-dimethoxy-2,2'-bipyridyl are more preferable.

Examples of the compound containing a phenanthroline ring include 1,10-phenanthroline.

Examples of the compound containing a tetrazole ring include 1H-tetrazole, 5-amino-1H-tetrazole, 5-methyl-1H-tetrazole, 5-phenyl-1H-tetrazole, and 1-(2-diaminoethyl)-5-mercaptotetrazole.

Examples of the compound containing a pyrazole ring include 3,5-dimethylpyrazole, 3-amino-5-methylpyrazole, 4-methylpyrazole, and 3-amino-5-hydroxypyrazole.

Examples of the compound containing a pyrimidine ring include pyrimidine, 4-methylpyrimidine, 1,2,4-triazolo[1,5-a]pyrimidine, 1,3,4,6,7,8-hexahydro-2H-pyrimido[1,2-a]pyrimidine, 1,3-diphenyl-pyrimidine-2,4,6-trione, 1,4,5,6-tetrahydropyrimidine, 2,4,5,6-tetraaminopyrimidinesulfate, 2,4,5-trihydroxypyrimidine, 2,4,6-triaminopyrimidine, 2,4,6-trichloropyrimidine, 2,4,6-trimethoxypyrimidine, 2,4,6-triphenylpyrimidine, 2,4-diamino-6-hydroxypyrimidine, 2,4-diaminopyrimidine, 2-acetamidopyrimidine, 2-aminopyrimidine, 2-methyl-5,7-diphenyl-(1,2,4)triazolo(1,5-a)pyrimidine, 2-methylsulfanyl-5,7-diphenyl-(1,2,4)triazolo(1,5-a)pyrimidine, 2-methylsulfanyl-5,7-diphenyl-4,7-dihydro-(1,2,4)triazolo(1,5-a)pyrimidine, and 4-aminopyrazolo[3,4-d]pyrimidine.

Examples of the compound containing a purine ring include adenine, guanine, hypoxanthine, xanthine, uric acid, and theophylline.

One kind of the anticorrosion agent may be used alone, or two or more kinds thereof may be used in combination.

In a case where the aqueous cleaning liquid according to the present embodiment contains an anticorrosion agent, the content of the anticorrosion agent is not particularly limited; however, it is preferably in a range of 0.0001% to 0.2% by mass (1 to 2,000 ppm), more preferably in a range of 0.0003% to 0.1% by mass (3 to 1,000 ppm), still more preferably in a range of 0.0005% to 0.05% by mass (5 to 500 ppm), and particularly preferably in a range of 0.001% to 0.03% by mass (10 to 300 ppm) with respect to the total mass of the aqueous cleaning liquid.

The aqueous cleaning liquid of the present embodiment may not contain one or more kinds of compounds selected from the group consisting of a compound containing an imidazole ring, a compound containing a pyridine ring, a compound containing a phenanthroline ring, a compound containing a tetrazole ring, a compound containing a pyrazole ring, a compound containing a pyrimidine ring, and a compound containing a purine ring, and it may not contain one or more kinds of the compounds described as the specific examples of the anticorrosion agent. The aqueous cleaning liquid according to the present embodiment may not contain the anticorrosion agent.

«Surfactant Other than Nonionic Surfactant»

The aqueous cleaning liquid according to the present embodiment may contain a surfactant for the intended purpose of preventing foaming and adjusting the wettability of the cleaning liquid to a substrate. Examples of the surfactant include an anionic surfactant, a cationic surfactant, and an amphoteric surfactant.

Examples of the anionic surfactant include an alkylsulfonic acid, an alkylbenzenesulfonic acid, an alkylnaphthalenesulfonic acid, an alkyldiphenyl ether sulfonic acid, a fatty acid amidosulfonic acid, a polyoxyethylene alkyl ether carboxylic acid, a polyoxyethylene alkyl ether acetic acid, a polyoxyethylene alkyl ether propionic acid, an alkyl phosphonic acid, and a fatty acid salt. Examples of "salt" include an ammonium salt, a sodium salt, a potassium salt, and a tetramethylammonium salt.

Examples of the cationic surfactant include an alkylpyridium-based surfactant.

Examples of the amphoteric surfactant include a betaine type surfactant, an amino acid type surfactant, an imidazoline type surfactant, and an amine oxide type surfactant.

These surfactants are generally commercially available. One kind of the surfactant may be used alone, or two or more kinds thereof may be used in combination.

In a case where the aqueous cleaning liquid according to the present embodiment contains a surfactant, the content of the surfactant is not particularly limited; however, it is, for example, preferably in a range of 0.0001% to 5% by mass, more preferably in a range of 0.001% to 3% by mass, still more preferably in a range of 0.002% to 1% by mass, and particularly preferably in a range of 0.002% to 0.2% by mass with respect to the total mass of the aqueous cleaning liquid. In a case where the content of the surfactant is in the above-described preferred range, bubbles that are generated by the foaming agent are likely to be dense.

The aqueous cleaning liquid according to the present embodiment may not contain one or more kinds of surfactants selected from the group consisting of an anionic surfactant, a cationic surfactant, and an amphoteric surfactant, and it may not contain one or more kinds of the compounds described as the examples of these surfactants. The aqueous cleaning liquid according to the present embodiment may not contain a surfactant.

«pH Adjusting Agent»

The aqueous cleaning liquid according to the present embodiment may contain a pH adjusting agent other than the acid component in a range where the effect of the present invention is not impaired. Examples of the pH adjusting agent include a basic compound. The basic compound may be an organic basic compound or may be an inorganic basic compound.

Examples of the inorganic basic compound include an inorganic compound containing an alkali metal or an alkaline earth metal and a salt thereof. Examples thereof include ammonium hydroxide, lithium hydroxide, sodium hydroxide, potassium hydroxide, rubidium hydroxide, and cesium hydroxide.

Examples of the organic basic compound include a quaternary ammonium salt and an alkylamine (such as trimethylamine or triethylamine). Examples of the quaternary ammonium salt include tetramethylammonium hydroxide (TMAH), bis(2-hydroxyethyl)dimethylammonium hydroxide, tetraethylammonium hydroxide (TEAH), tetrapropylammonium hydroxide, tetrabutylammonium hydroxide, methyltriethylammonium hydroxide, trimethyl(hydroxyethyl)ammonium hydroxide, and triethyl(hydroxyethyl)ammonium hydroxide.

One kind of the pH adjusting agent may be used alone, or two or more kinds thereof may be used in combination.

The aqueous cleaning liquid according to the present embodiment may not contain a pH adjusting agent other than the acid component and may not contain one or more kinds of the pH adjusting agents described as the examples thereof.

«Buffer»

The aqueous cleaning liquid according to the present embodiment may contain a buffer. The buffer is a compound having an action of suppressing a change in the pH of a solution.

The buffer is not particularly limited as long as it is a compound having a pH buffering ability. As the buffer, for example, a compound having a pKa of 6 to 11 can be used.

Examples of the buffer include a Good's buffer. Example of the Good's buffer include 2-cyclohexylaminoethanesulfonic acid (CHES), 3-cyclohexylaminopropanesulfonic acid (CAPS), N-tris(hydroxymethyl)methyl-3-aminopropanesulfonic acid (TAPS), 4-(cyclohexylamino)-1-butanesulfonic acid (CABS), tricine, bicine, 2-morpholinoethanesulfonic acid monohydrate (MES), bis(2-hydroxyethyl)aminotris(hydroxymethyl)methane (Bis-Tris), N-(2-acetamido)iminodiacetic acid (ADA), piperazine-1,4-bis(2-ethanesulfonic acid) (PIPES), N-(2-acetamido)-2-aminoethanesulfonic acid (ACES), 2-hydroxy-3-morpholinopropanesulfonic acid (MOPSO), N,N-bis(2-hydroxyethyl)-2-aminoethanesulfonic acid (BES), 3-morpholinopropanesulfonic acid (MOPS), N-tris(hydroxymethyl)methyl-2-aminoethanesulfonic acid (TES), 2-[4-(2-hydroxyethyl)-1-piperazinyl]ethanesulfonic acid (HEPES), 3-[N-tris(hydroxymethyl)methylamino]-2-hydroxypropanesulfonic acid (TAPSO), piperazine-1,4-bis(2-hydroxypropanesulfonic acid) (POPSO), 4-(2-hydroxyethyl)piperazine-1-(2-hydroxypropane-3-sulfonic acid) (HEPSO), and 4-(2-hydroxyethyl)-1-piperazinepropanesulfonic acid (EPPS).

One kind of the buffer may be used alone, or two or more kinds thereof may be used in combination.

In a case where the aqueous cleaning liquid according to the present embodiment contains a buffer, the content of the buffer is not particularly limited. However, it may be in a range of 0.001% by mass to 10% by mass, and it is preferably in a range of 0.005% by mass to 5% by mass, more preferably in a range of 0.01% by mass to 1% by mass, and particularly preferably in a range of 0.05% by mass to 0.5% by mass or in a range of 0.05% by mass to 0.3% by mass with respect to the total mass of the aqueous cleaning liquid.

The aqueous cleaning liquid according to the present embodiment may not contain a buffer and may not contain one or more kinds of the compounds described as the specific examples of the buffer.

«Organic Solvent»

The aqueous cleaning liquid according to the present embodiment may contain an organic solvent in a range where the effect of the present invention is not impaired. The organic solvent is preferably a water-soluble organic solvent. Examples of the water-soluble organic solvent include alcohols (for example, isopropanol, ethanol, ethylene glycol, propylene glycol, glycerin, 1,3-propanediol, 1,3-butanediol, 1,4-butanediol, diethylene glycol, dipropylene glycol, furfuryl alcohol, and 2-methyl-2,4-pentanediol), dimethyl sulfoxide, and ethers (for example, ethylene glycol dimethyl ether, diethylene glycol dimethyl ether, triethylene glycol dimethyl ether, tetraethylene glycol dimethyl ether, and propylene glycol dimethyl ether).

One kind of the water-soluble organic solvent may be used alone, or two or more kinds thereof may be used in combination.

In a case where the aqueous cleaning liquid according to the present embodiment contains a water-soluble organic solvent, the content of the water-soluble organic solvent is preferably 50% by mass or less, more preferably 30% by mass or less, and still more preferably 20% by mass or less with respect to the total amount of water and the water-soluble organic solvent.

The aqueous cleaning liquid according to the present embodiment may not contain an organic solvent or a water-soluble organic solvent and may not contain one or more kinds of the compounds described as the specific examples of the water-soluble organic solvent.

«Impurities and Like»

The aqueous cleaning liquid according to the present embodiment may contain metal impurities containing a metal atom such as a Fe atom, a Cr atom, a Ni atom, a Zn atom, a Ca atom, or a Pb atom. The total content of the metal atoms in the aqueous cleaning liquid according to the present embodiment is preferably 100 ppt by mass or less with respect to the total mass of the aqueous cleaning liquid. The lower limit value of the total content of the metal atoms is preferably as low as possible; however, examples thereof include 0.001 ppt by mass or more. Examples of the total content of the metal atoms include 0.001 ppt by mass to 100 ppt by mass. In a case of setting the total content of the metal atoms to be equal to or smaller than the preferred upper limit value, the defect suppressibility and the residue suppressibility of the cleaning liquid are improved. It is conceived that in a case where the total content of the metal atoms is set to be equal to or larger than the preferred lower limit value, the metal atoms are less likely to be released to be present in the system and less likely to adversely affect a production yield of the entire object to be cleaned.

The content of the metal impurities can be adjusted by, for example, a purification treatment such as filtering. The purification treatment such as filtering may be carried out on a part or the whole raw material before the preparation of the cleaning liquid or may be carried out after the preparation of the aqueous cleaning liquid.

The aqueous cleaning liquid according to the present embodiment may contain, for example, impurities derived from an organic substance (organic impurities). The total content of the organic impurities in the aqueous cleaning liquid according to the present embodiment is preferably 5,000 ppm by mass or less. The lower limit of the content of the organic impurities is preferably as low as possible; however, examples thereof include 1 ppq by mass or more. The total content of the organic impurities is, for example, in a range of 1 ppq by mass to 5,000 ppm by mass.

The aqueous cleaning liquid according to the present embodiment may contain, for example, objects to be counted which have such a size that can be counted by a light scattering type in-liquid particle counter. The size of the object to be counted is, for example, 0.04 m or more. The number of objects to be counted in the aqueous cleaning liquid according to the present embodiment is, for example, 1,000 or less per mL of the aqueous cleaning liquid, and the lower limit value thereof is, for example, 1 or more. It is conceived that in a case where the number of objects to be counted in the aqueous cleaning liquid is in the above-described range, the metal corrosion suppressing effect of the aqueous cleaning liquid is improved.

The size of the objects to be counted may be a size that can be detected by a light scattering type in-liquid particle counter, and it may be, for example, 0.001 m or more.

The organic impurities and/or the objects to be counted may be added to the cleaning liquid or may be inevitably mixed into the cleaning liquid in a step of producing the aqueous cleaning liquid. Examples of the case where organic impurities and/or the objects to be counted are inevitably mixed in a step of producing the aqueous cleaning liquid include a case where organic impurities are contained in a raw material (for example, an organic solvent) that is used for the production of the aqueous cleaning liquid contain, and a case where organic impurities are mixed (for example, contamination) from the external environment in a step of producing the aqueous cleaning liquid, which are not limited thereto.

In a case where the objects to be counted are added to the aqueous cleaning liquid, the abundance ratio thereof may be adjusted for each specific size in consideration of the surface roughness and the like of the cleaning target.

<Storage Container>

A method for storing the chemical liquid of the present embodiment is not particularly limited, and storage containers known in the related art can be used. In order to ensure the stability of the chemical liquid, a void ratio in a container in a case of storing the chemical liquid in the container and/or a type of gas filling the voids may be appropriately set. For example, the void ratio in the storage container may be approximately in a range of 0.01% to 30% by volume.

In a case of using the chemical liquid according to the present embodiment, the chemical liquid may be diluted in a range of 2 to 2,000 times to obtain a diluted liquid, and then a substrate may be treated using the diluted liquid. The chemical liquid can be diluted with, for example, water.

The content of each component contained in the chemical liquid according to the present embodiment may be a measured value measured by a measuring device. As the measuring device, a known device can be appropriately selected depending on the kind of the component.

In a case where the content of the target component is lower than the detection limit, the chemical liquid may be subjected to measurement after being appropriately concentrated.

Each component contained in the chemical liquid according to the present embodiment may be appropriately purified before being blended into the chemical liquid. As the purification method, a known method can be used depending on the kind of the component.

<pH>

The pH of the aqueous cleaning liquid of the present embodiment is preferably in a range of 2 to 9, more preferably in a range of 3 to 8, and still more preferably in a range of 3 to 7.

In a case where the pH of the aqueous cleaning liquid is in the above-described preferred range, both the cleanability and the anticorrosion properties are easily achieved.

The aqueous cleaning liquid according to the present embodiment may not contain one or more kinds of compounds selected from C4 to C13 alkyl phosphonic acids, C4 to C13 alkyl phosphonic acid esters, C4 to C13 alkyl phosphoric acids, and salts thereof.

Since the aqueous cleaning liquid according to the present embodiment contains hydrofluoric acid as an acid component, the cleanability is favorable. In general, a cleaning liquid containing hydrofluoric acid has excellent cleanability; however, the anticorrosion properties thereof are likely to be deteriorated.

The aqueous cleaning liquid according to the present embodiment further contains at least one kind of triazole compound selected from the group consisting of triazole and a triazole derivative, and a nonionic surfactant. In general, a nonionic surfactant (particularly an acetylenol type surfactant) is difficult to be dissolved in an aqueous cleaning liquid. However, as a result of studies, the inventors of the present invention found that in a case of adding such an amount of a nonionic surfactant, to an aqueous cleaning liquid containing hydrofluoric acid, that can be dissolved in the aqueous cleaning liquid, it is possible to improve the anticorrosion properties while maintaining the cleanability.

(Cleaning Method for Electronic Device)

A cleaning method for an electronic device according to the present embodiment includes a step of bringing the aqueous cleaning liquid into contact with an electronic device.

Typically, dry etching residues can be removed by bringing the aqueous cleaning liquid into contact with an electronic device (for example, a semiconductor element) in a wet etching step (or steps before and after the wet etching step).

As a contact method, for example, the aqueous cleaning liquid is accommodated in a cleaning container, an electronic device to be cleaned is immersed in the aqueous cleaning liquid, whereby dry etching residues can be removed, and the electronic device can be cleaned. Alternatively, an electronic device is treated according to a sheet type cleaning method, whereby dry etching residues can be removed, and the electronic device can be cleaned. The aqueous cleaning liquid is suitably used as an etchant as well as a dry etching residue removing liquid (cleaning liquid). In addition, the aqueous cleaning liquid can also be used as a cleaning liquid for cleaning an electronic device after a chemical-mechanical polishing (CMP) step.

The temperature at which the aqueous cleaning liquid is used is typically in a range of 10° C. to 80° C., preferably in a range of 15° C. to 70° C., more preferably in a range of 20° C. to 65° C., and particularly preferably in a range of 20° C. to 60° C. The temperature can be appropriately selected depending on the cleaning conditions and the electronic device (for example, a semiconductor element) to be used.

The time during which the aqueous cleaning liquid is used is typically in a range of 0.2 to 60 minutes. The time can be appropriately selected depending on the cleaning conditions and the electronic device (for example, a semiconductor element) to be used. As a rinsing liquid that is used after using the aqueous cleaning liquid, an organic solvent, water, carbonated water, or ammonia water can be used.

Examples of the electronic device serving as a cleaning target and a production target, which can be suitably used in the present embodiment, include a semiconductor element and a display element. In general, an intermediate product after the dry etching step is used as a cleaning target. Examples of the semiconductor element and the display element include substrate materials such as silicon, amorphous silicon, polysilicon, and glass, insulating materials such as silicon oxide, silicon nitride, silicon carbide, and derivatives thereof, materials such as cobalt, a cobalt alloy, tungsten, and titanium-tungsten, compound semiconductors such as gallium-arsenic, gallium-phosphorus, indium-phosphorus, indium-gallium-arsenic, and indium-aluminum-arsenic, and oxide semiconductors such as chromium oxide. Particularly preferred examples of the electronic device serving as a cleaning target in the present embodiment include a cobalt or cobalt alloy wiring material, a zirconia-based hard mask, and an element in which a low dielectric constant interlayer insulating film is used.

EXAMPLES

Hereinafter, the present invention will be described in more detail based on Examples; however, the present invention is not limited to these Examples.

(Evaluation of Foaming)

A transparent glass bottle was filled with an appropriate amount of a sample, the lid was closed, and then the favorability of foaming (rapidity of foaming) in a case where foaming was carried out by hand for 20 seconds was visually evaluated according to the following standards.

A: Foaming does not occur.

B: Foaming occurs slightly.

C: Foaming occurs.

(Evaluation of Metal Anticorrosion Properties)

A wafer attached with a cobalt film was immersed in an aqueous cleaning liquid at 25° C. for 1 minute, and the etching rate was measured. The film thickness (nm) of each cobalt film before and after etching was measured with a fluorescent X-ray analyzer (manufactured by RIGAKU Corporation), and the etching rate (film thickness etched per unit time (1 minute); Å/min) was calculated.

<Preparation (1) of Aqueous Cleaning Liquid>

Examples 1 to 11 and Comparative Examples 1 and 2

Each component listed in Table 1 was mixed, and acetic acid and ammonium hydroxide were blended to have the pH shown in Table 1, thereby preparing an aqueous cleaning liquid of each example. Then, the foaming and the etching resistance were evaluated according to the above-described methods. The results are shown in Table 1.

TABLE 1

| | HF (ppm) | Nitrogen-containing aromatic heterocyclic compound (ppm) | | | Nonionic surfactant (ppm) | Water | pH | Foaming | Etching rate (Å/min) |
|---|---|---|---|---|---|---|---|---|---|
| Comparative Example 1 | 1500 | | — | | — | Residual part | 3 | A | 55.9 |
| Comparative Example 2 | 1500 | (N)-1 1000 | — | — | — | Residual part | 3 | A | 20.4 |
| Example 1 | 1500 | (N)-1 1000 | — | — | (S)-1 500 | Residual part | 3 | C | 6.8 |
| Example 2 | 1500 | (N)-2 1000 | — | — | (S)-1 500 | Residual part | 3 | C | 40.9 |
| Example 3 | 1500 | (N)-1 1000 | — | — | (S)-2 500 | Residual part | 3 | B | 7.2 |
| Example 4 | 1500 | (N)-1 1000 | — | — | (S)-3 500 | Residual part | 3 | A | 6.3 |
| Example 5 | 1500 | (N)-2 1000 | — | — | (S)-3 500 | Residual part | 3 | A | 38.4 |
| Example 6 | 1500 | (N)-1 1000 | (N)-2 1000 | — | (S)-3 500 | Residual part | 3 | A | 6.0 |
| Example 7 | 1500 | (N)-3 1000 | — | — | (S)-3 500 | Residual part | 3 | A | 13.7 |
| Example 8 | 1500 | (N)-4 1000 | — | — | (S)-3 500 | Residual part | 3 | A | 8.9 |
| Example 9 | 1500 | (N)-1 1000 | (N)-5 6 | — | (S)-3 500 | Residual part | 3 | A | 6.2 |
| Example 10 | 1500 | (N)-1 1000 | (N)-6 6 | — | (S)-3 500 | Residual part | 3 | A | 6.2 |
| Example 11 | 1500 | (N)-1 1000 | (N)-5 6 | (N)-6 6 | (S)-3 500 | Residual part | 3 | A | 5.8 |

In Table 1, each abbreviation has the following meaning.

HF: hydrofluoric acid (N)-1: 5-methyl-1H-benzotriazole (5MBTA) represented by Formula (N-1).

(N)-2: 1,2,4-triazole represented by Formula (N-2).

(N)-3: 1,2,3-benzotriazole (BTA) represented by Formula (N-3).

(N)-4: 5,6-dimethyl-1H-1,2,3-benzotriazole (DMBTA) represented by Formula (N-4).

(N)-5: 5-(m-tolyl)-1H-benzotriazole represented by Formula (N-4).

(N)-6: 5-(4,6-dimethyl-2,3-dihydro-1H-inden-5-yl)-1H-benzotriazole represented by Formula (N-5).

[Chemical Formula 11]

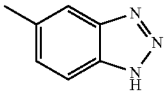

(N-1)

(N-2)

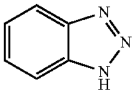

(N-3)

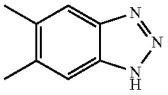

(N-4)

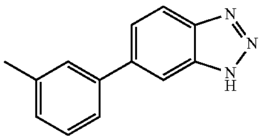

(N-5)

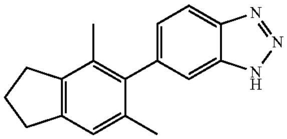

(N-6)

TABLE 1-continued

| HF (ppm) | Nitrogen-containing aromatic heterocyclic compound (ppm) | Nonionic surfactant (ppm) | Water | pH | Foaming | Etching rate (Å/min) |
|---|---|---|---|---|---|---|

(S)-1: Nonionic surfactant represented by Formula (S-1) (product name: Triton X-100, manufactured by Dow Chemical Company).

(S)-2: Nonionic surfactant represented by Formula (S-2) (product name: N-lauroyl sarcosine, manufactured by Tokyo Chemical Industry Co., Ltd.).

(S)-3: Nonionic surfactant represented by Formula (S-3) (product name: Acetyleneol E40, manufactured by TAKEMOTO OIL & FAT Co., Ltd.).

[Chemical Formula 12]

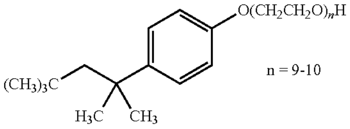

n = 9-10

(S-1)

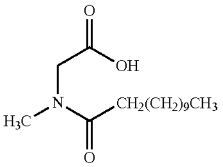

(S-2)

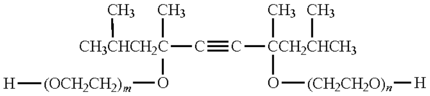

m + n = 4

(S-3)

From the results shown in Table 1, it was confirmed that the aqueous cleaning liquids of Examples 1 to 11 have favorable metal anticorrosion properties as compared with the aqueous cleaning liquids of Comparative Example 1.

It was confirmed that the aqueous cleaning liquids of Examples 3 to 11 suppress the occurrence of foaming.

It was confirmed that the aqueous cleaning liquids of Examples 1, 3, 4, and 6 to 11 have favorable metal anticorrosion properties as compared with the aqueous cleaning liquids of Comparative Example 2. In particular, it was confirmed that the aqueous cleaning liquids of Examples 4 and 6 to 11 have favorable metal anticorrosion properties as compared with the aqueous cleaning liquids of Comparative Example 2, and no foaming occurs.

<Preparation (2) of Aqueous Cleaning Liquid>

Examples 12 to 22 and Comparative Examples 3 and 4

Each component listed in Table 2 was mixed, and acetic acid and ammonium hydroxide were blended to have the pH shown in Table 2, thereby preparing an aqueous cleaning liquid of each example. Then, the foaming and the etching resistance were evaluated according to the above-described methods. The results are shown in Table 2.

TABLE 2

| | HF (ppm) | Nitrogen-containing aromatic heterocyclic compound (ppm) | | | Nonionic surfactant (ppm) | Water | pH | Foaming | Etching rate (Å/min) |
|---|---|---|---|---|---|---|---|---|---|
| Comparative Example 3 | 1500 | — | | | — | Residual part | 4 | A | 53.5 |
| Comparative Example 4 | 1500 | (N)-1 1000 | — | — | — | Residual part | 4 | A | 17.0 |
| Example 12 | 1500 | (N)-1 1000 | — | — | (S)-1 500 | Residual part | 4 | C | 6.2 |
| Example 13 | 1500 | (N)-2 1000 | — | — | (S)-1 500 | Residual part | 4 | C | 38.8 |
| Example 14 | 1500 | (N)-1 1000 | — | — | (S)-2 500 | Residual part | 4 | B | 6.6 |
| Example 15 | 1500 | (N)-1 1000 | — | — | (S)-3 500 | Residual part | 4 | A | 4.9 |
| Example 16 | 1500 | (N)-2 1000 | — | — | (S)-3 500 | Residual part | 4 | A | 30.2 |
| Example 17 | 1500 | (N)-1 1000 | (N)-2 1000 | — | (S)-3 500 | Residual part | 4 | A | 4.2 |
| Example 18 | 1500 | (N)-3 1000 | — | — | (S)-3 500 | Residual part | 4 | A | 12.0 |
| Example 19 | 1500 | (N)-4 1000 | — | — | (S)-3 500 | Residual part | 4 | A | 7.2 |

TABLE 2-continued

| | HF (ppm) | Nitrogen-containing aromatic heterocyclic compound (ppm) | | | Nonionic surfactant (ppm) | Water | pH | Foaming | Etching rate (Å/min) |
|---|---|---|---|---|---|---|---|---|---|
| Example 20 | 1500 | (N)-1 1000 | (N)-5 6 | — | (S)-3 500 | Residual part | 4 | A | 4.9 |
| Example 21 | 1500 | (N)-1 1000 | (N)-6 6 | — | (S)-3 500 | Residual part | 4 | A | 4.4 |
| Example 22 | 1500 | (N)-1 1000 | (N)-5 6 | (N)-6 6 | (S)-3 500 | Residual part | 4 | A | 4.0 |

From the results shown in Table 2, it was confirmed that the aqueous cleaning liquids of Examples 12 to 22 have favorable metal anticorrosion properties as compared with the aqueous cleaning liquids of Comparative Example 3.

It was confirmed that the aqueous cleaning liquids of Examples 14 to 22 suppress the occurrence of foaming.

It was confirmed that the aqueous cleaning liquids of Examples 12, 14, 15, and 17 to 22 have favorable metal anticorrosion properties as compared with the aqueous cleaning liquids of Comparative Example 4. In particular, it was confirmed that the aqueous cleaning liquids of Examples 15 and 17 to 22 have favorable metal anticorrosion properties as compared with the aqueous cleaning liquids of Comparative Example 4, and no foaming occurs.

<Preparation (3) of Aqueous Cleaning Liquid>

Examples 23 to 38 and Comparative Examples 5 to 9

Each component listed in Table 3 was mixed, and acetic acid and ammonium hydroxide were blended to have the pH shown in Table 3, thereby preparing an aqueous cleaning liquid of each example. Then, the foaming and the etching resistance were evaluated according to the above-described methods. The results are shown in Table 3.

TABLE 3

| | HF (ppm) | Nitrogen-containing aromatic heterocyclic compound (ppm) | | | Nonionic surfactant (ppm) | Water | pH | Foaming | Etching rate (Å/min) |
|---|---|---|---|---|---|---|---|---|---|
| Comparative Example 5 | 1500 | | — | | — | Residual part | 5 | A | 38.4 |
| Comparative Example 6 | 1500 | (N)-1 1000 | — | — | — | Residual part | 5 | A | 8.4 |
| Comparative Example 7 | 1500 | | — | | (S)-1 500 | Residual part | 5 | C | 24.3 |
| Example 23 | 1500 | (N)-1 1000 | — | — | (S)-1 500 | Residual part | 5 | C | 3.3 |
| Example 24 | 1500 | (N)-2 1000 | — | — | (S)-1 500 | Residual part | 5 | C | 25.0 |
| Comparative Example 8 | 1500 | | — | | (S)-2 500 | Residual part | 5 | B | 12.0 |
| Example 25 | 1500 | (N)-1 1000 | — | — | (S)-2 500 | Residual part | 5 | B | 4.1 |
| Comparative Example 9 | 1500 | | — | | (S)-3 500 | Residual part | 5 | A | 10.0 |
| Example 26 | 1500 | (N)-1 1000 | — | — | (S)-3 500 | Residual part | 5 | A | 1.8 |
| Example 27 | 1500 | (N)-2 1000 | — | — | (S)-3 500 | Residual part | 5 | A | 21.2 |
| Example 28 | 1500 | (N)-1 1000 | (N)-2 1000 | — | (S)-3 500 | Residual part | 5 | A | 1.1 |
| Example 29 | 1500 | (N)-3 1000 | — | — | (S)-3 500 | Residual part | 5 | A | 5.3 |
| Example 30 | 1500 | (N)-4 1000 | — | — | (S)-3 500 | Residual part | 5 | A | 3.3 |
| Example 31 | 1500 | (N)-1 1000 | (N)-5 6 | — | (S)-3 500 | Residual part | 5 | A | 1.6 |
| Example 32 | 1500 | (N)-1 1000 | (N)-6 6 | — | (S)-3 500 | Residual part | 5 | A | 1.0 |
| Example 33 | 1500 | (N)-1 1000 | (N)-5 6 | (N)-6 6 | (S)-3 500 | Residual part | 5 | A | 0.8 |
| Example 34 | 1500 | (N)-1 1000 | — | — | (S)-3 50 | Residual part | 5 | A | 3.4 |
| Example 35 | 1500 | (N)-1 1000 | — | — | (S)-3 100 | Residual part | 5 | A | 2.8 |
| Example 36 | 1500 | (N)-1 1000 | — | — | (S)-3 200 | Residual part | 5 | A | 2.5 |
| Example 37 | 1500 | (N)-1 1000 | — | — | (S)-3 300 | Residual part | 5 | A | 2.0 |
| Example 38 | 1500 | (N)-1 1000 | — | — | (S)-3 1000 | Residual part | 5 | A | 1.3 |

From the results shown in Table 3, it was confirmed that the aqueous cleaning liquids of Examples 23 to 38 have favorable metal anticorrosion properties as compared with the aqueous cleaning liquids of Comparative Example 5.

It was confirmed that the aqueous cleaning liquids of Examples 25 to 38 suppress the occurrence of foaming.

It was confirmed that the aqueous cleaning liquids of Examples 23, 25, 26, and 28 to 38 have favorable metal anticorrosion properties as compared with the aqueous cleaning liquids of Comparative Example 6. In particular, it was confirmed that the aqueous cleaning liquids of Examples 26 and 28 to 38 have favorable metal anticorrosion properties as compared with the aqueous cleaning liquids of Comparative Example 6, and no foaming occurs.

It was confirmed that the aqueous cleaning liquids of Examples 26 and 28 to 38 have favorable metal anticorrosion properties as compared with the aqueous cleaning liquids of Comparative Example 9, and no foaming occurs.

<Preparation (4) of Aqueous Cleaning Liquid>

Examples 39 to 54 and Comparative Examples 10 and 11

Each component listed in Table 4 was mixed, and acetic acid and ammonium hydroxide were blended to have the pH shown in Table 4, thereby preparing an aqueous cleaning liquid of each example. Then, the foaming and the etching resistance were evaluated according to the above-described methods. The results are shown in Table 4.

From the results shown in Table 4, it was confirmed that the aqueous cleaning liquids of Examples 39 to 54 have favorable metal anticorrosion properties as compared with the aqueous cleaning liquids of Comparative Example 10.

It was confirmed that the aqueous cleaning liquids of Examples 41 to 54 suppress the occurrence of foaming.

It was confirmed that the aqueous cleaning liquids of Examples 39, 41, 42, 44, and 46 to 54 have favorable metal anticorrosion properties as compared with the aqueous cleaning liquids of Comparative Example 11. In particular, it was confirmed that the aqueous cleaning liquids of Examples 42, 44, and 46 to 54 have favorable metal anticorrosion properties as compared with the aqueous cleaning liquids of Comparative Example 11, and no foaming occurs.

<Preparation (5) of Aqueous Cleaning Liquid>

Examples 55 to 65 and Comparative Examples 12 and 13

Each component listed in Table 5 was mixed, and acetic acid and ammonium hydroxide were blended to have the pH shown in Table 5, thereby preparing an aqueous cleaning liquid of each example. Then, the foaming and the etching resistance were evaluated according to the above-described methods. The results are shown in Table 5.

TABLE 4

| | HF (ppm) | Nitrogen-containing aromatic heterocyclic compound (ppm) | | | Nonionic surfactant (ppm) | | pH | Foaming | Etching rate (Å/min) |
|---|---|---|---|---|---|---|---|---|---|
| Comparative Example 10 | 1500 | — | | | — | Residual part | 6 | A | 7.5 |
| Comparative Example 11 | 1500 | (N)-1 1000 | — | — | — | Residual part | 6 | A | 3.2 |
| Example 39 | 1500 | (N)-1 1000 | — | — | (S)-1 500 | Residual part | 6 | C | 1.3 |
| Example 40 | 1500 | (N)-2 1000 | — | — | (S)-1 500 | Residual part | 6 | C | 5.7 |
| Example 41 | 1500 | (N)-1 1000 | — | — | (S)-2 500 | Residual part | 6 | B | 1.9 |
| Example 42 | 1500 | (N)-1 1000 | — | — | (S)-3 500 | Residual part | 6 | A | 1.1 |
| Example 43 | 1500 | (N)-2 1000 | — | — | (S)-3 500 | Residual part | 6 | A | 5.6 |
| Example 44 | 1500 | (N)-1 1000 | (N)-2 1000 | — | (S)-3 500 | Residual part | 6 | A | 1.0 |
| Example 45 | 1500 | (N)-3 1000 | — | — | (S)-3 500 | Residual part | 6 | A | 3.7 |
| Example 46 | 1500 | (N)-4 1000 | — | — | (S)-3 500 | Residual part | 6 | A | 2.5 |
| Example 47 | 1500 | (N)-1 1000 | (N)-5 6 | — | (S)-3 500 | Residual part | 6 | A | 0.8 |
| Example 48 | 1500 | (N)-1 1000 | (N)-6 6 | — | (S)-3 500 | Residual part | 6 | A | 1.0 |
| Example 49 | 1500 | (N)-1 1000 | (N)-5 6 | (N)-6 6 | (S)-3 500 | Residual part | 6 | A | 0.5 |
| Example 50 | 1500 | (N)-1 1000 | — | — | (S)-3 50 | Residual part | 6 | A | 1.6 |
| Example 51 | 1500 | (N)-1 1000 | — | — | (S)-3 100 | Residual part | 6 | A | 1.2 |
| Example 52 | 1500 | (N)-1 1000 | — | — | (S)-3 200 | Residual part | 6 | A | 1.0 |
| Example 53 | 1500 | (N)-1 1000 | — | — | (S)-3 300 | Residual part | 6 | A | 0.9 |
| Example 54 | 1500 | (N)-1 1000 | — | — | (S)-3 1000 | Residual part | 6 | A | 0.6 |

TABLE 5

| | HF (ppm) | Nitrogen-containing aromatic heterocyclic compound (ppm) | | | Nonionic surfactant (ppm) | Water | pH | Foaming | Etching rate (Å/min) |
|---|---|---|---|---|---|---|---|---|---|
| Comparative Example 12 | 1500 | | — | | — | Residual part | 7 | A | 4.8 |
| Comparative Example 13 | 1500 | (N)-1 1000 | — | — | — | Residual part | 7 | A | 1.8 |
| Example 55 | 1500 | (N)-1 1000 | — | — | (S)-1 500 | Residual part | 7 | C | 0.9 |
| Example 56 | 1500 | (N)-2 1000 | — | — | (S)-1 500 | Residual part | 7 | C | 4.0 |
| Example 57 | 1500 | (N)-1 1000 | — | — | (S)-2 500 | Residual part | 7 | B | 1.4 |
| Example 58 | 1500 | (N)-1 1000 | — | — | (S)-3 500 | Residual part | 7 | A | 0.7 |
| Example 59 | 1500 | (N)-2 1000 | — | — | (S)-3 500 | Residual part | 7 | A | 3.2 |
| Example 60 | 1500 | (N)-1 1000 | (N)-2 1000 | — | (S)-3 500 | Residual part | 7 | A | 0.5 |
| Example 61 | 1500 | (N)-3 1000 | — | — | (S)-3 500 | Residual part | 7 | A | 2.1 |
| Example 62 | 1500 | (N)-4 1000 | — | — | (S)-3 500 | Residual part | 7 | A | 1.7 |
| Example 63 | 1500 | (N)-1 1000 | (N)-5 6 | — | (S)-3 500 | Residual part | 7 | A | 0.7 |
| Example 64 | 1500 | (N)-1 1000 | (N)-6 6 | — | (S)-3 500 | Residual part | 7 | A | 0.7 |
| Example 65 | 1500 | (N)-1 1000 | (N)-5 6 | (N)-6 6 | (S)-3 500 | Residual part | 7 | A | 0.4 |

From the results shown in Table 5, it was confirmed that the aqueous cleaning liquids of Examples 55 to 65 have favorable metal anticorrosion properties as compared with the aqueous cleaning liquids of Comparative Example 12.

It was confirmed that the aqueous cleaning liquids of Examples 57 to 65 suppress the occurrence of foaming.

It was confirmed that the aqueous cleaning liquids of Examples 55, 57, 58, 60, and 62 to 65 have favorable metal anticorrosion properties as compared with the aqueous cleaning liquids of Comparative Example 13. In particular, it was confirmed that the aqueous cleaning liquids of Examples 58, 60, and 62 to 65 have favorable metal anticorrosion properties as compared with the aqueous cleaning liquids of Comparative Example 11, and no foaming occurs.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

What is claimed is:

1. An aqueous cleaning liquid comprising, with respect to the total amount of the aqueous cleaning liquid:

from 300 ppm to 3,000 ppm of hydrofluoric acid;

from 500 ppm to 1% by mass of at least one kind of benzotriazole compound selected from the group consisting of benzotriazole and a benzotriazole derivative; and from 50 ppm to 1% by mass of a nonionic surfactant comprising an acetylenol surfactant, wherein the aqueous cleaning liquid has a pH in a range of 3 to 7.

2. The aqueous cleaning liquid according to claim 1, wherein the benzotriazole compound includes a compound (BT-1) represented by General Formula (BT-1):

(BT-1)

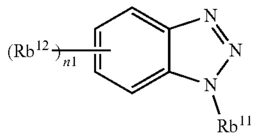

wherein $Rb^{11}$ represents a hydrogen atom, a hydroxyl group, or a substituted or unsubstituted hydrocarbon group; $Rb^{12}$ represents an alkyl group; n1 represents an integer in a range of 1 to 4; and in a case where n1 is an integer of 2 or more, a plurality of $Rb^{12}$'s may be the same or different from each other.

3. The aqueous cleaning liquid according to claim 1, wherein the aqueous cleaning liquid contains two or more kinds of the benzotriazole compounds.

4. The aqueous cleaning liquid according to claim 3, wherein the benzotriazole compound includes a compound (BT-1) represented by General Formula (BT-1) and a compound (BT-2) represented by General Formula (BT-2), (BT-1)

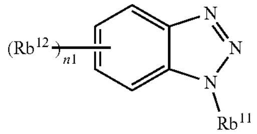

(BT-2)

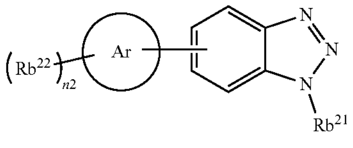

wherein $Rb^{11}$ represents a hydrogen atom, a hydroxyl group, or a substituted or unsubstituted hydrocarbon group; $Rb^{12}$ represents an alkyl group; n1 represents an integer in a range of 1 to 4; in a case where n1 is an integer of 2 or more, a plurality of $R^{12}$'s may be the same or different from each other; $Rb^{21}$ represents a hydrogen atom, a hydroxyl group, or a substituted or unsubstituted hydrocarbon group; Ar represents an aromatic ring; $Rb^{22}$ represents a substituted or unsubstituted hydrocarbon group; n2 represents an integer of 0 or more in a case of being allowed by a valence; and in a case where n2 is an integer of 2 or more, a plurality of $Rb^{22}$'s may be the same or different from each other, where the plurality of $Rb^{22}$'s may be bonded to each other to form a condensed ring together with Ar.

5. The aqueous cleaning liquid according to claim 4, wherein a mass ratio of the compound (BT-1):the compound (BT-2) is in a range of 10,000:1 to 1,000:1.

* * * * *